G. CROLL.
COMBINED CULTIVATOR AND HARROW.
No. 169,677. Patented Nov. 9, 1875.
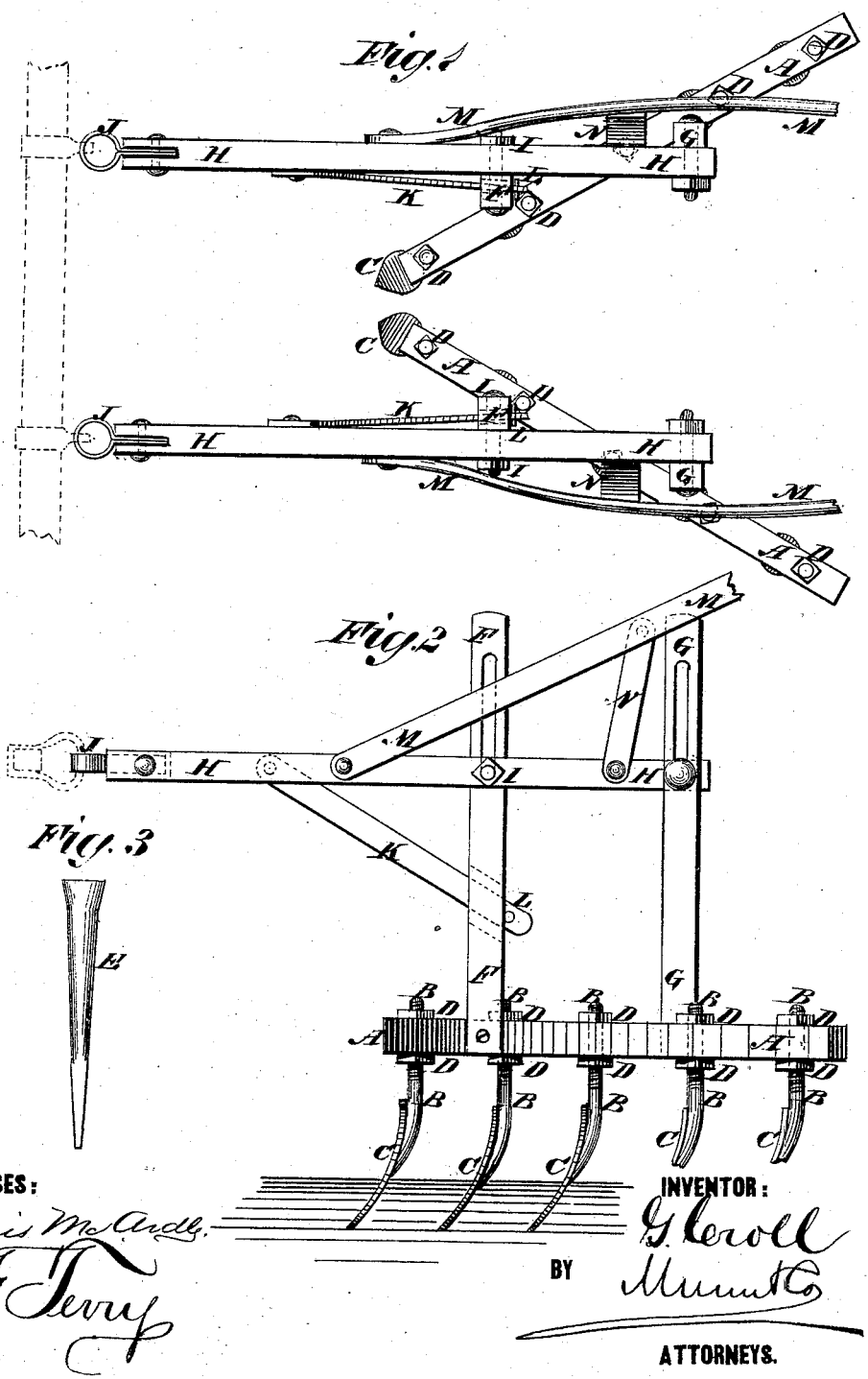

UNITED STATES PATENT OFFICE.

GEORGE CROLL, OF TONTOGANY, OHIO.

IMPROVEMENT IN COMBINED CULTIVATORS AND HARROWS.

Specification forming part of Letters Patent No. 169,677, dated November 9, 1875; application filed August 28, 1875.

*To all whom it may concern:*

Be it known that I, GEORGE CROLL, of Tontogany, in the county of Wood and State of Ohio, have invented a new and useful Improvement in Combined Cultivator and Harrow, of which the following is a specification:

Figure 1 is a top view of my improved machine. Fig. 2 is a side view of the same. Fig. 3 is a detail view of one of the harrow-teeth.

Similar letters of reference indicate corresponding parts.

The invention will first be described in connection with drawing, and then pointed out in claim.

A are the beams, through each of which, at equal distances apart, are formed five holes, to receive the shanks B of the shovel-plows C. The shanks B have screw-threads cut upon their upper parts to receive the nuts D, which are placed upon them, one above and one below the beams A, as shown in Fig. 2, so that by loosening the nuts D the plows C may be set at any desired angle toward or from the plants; and by removing the upper nuts D the shanks B of the shovels C may be detached, and harrow-teeth E inserted in the holes of the beams A. To the outer sides of the forward parts of the beams A are secured the lower ends of the forward standards F, and to the inner sides of the rear parts of the beams A are secured the lower ends of the rear standards G. H are the draft-bars, which are placed upon the outer sides of the forward standards F and upon the inner side of the rear standards G, and are secured in place by bolts I, which pass through holes in the draft-bars H, and through longitudinal slots in the standards F G, so that by loosening the nuts of the bolts I the beams A may be adjusted to run level whatever be the position of the draft-bars H. This construction brings the beams A at an angle with the draft-bars H, so that when the draft-bars H are parallel with each other the forward ends of the beams A may incline toward each other, as shown in Fig. 1. To the forward ends of the draft-bars H are attached couplings J, for connecting the said draft-bars with a sulky, and which should be so formed as to give the rear ends of the beams A a free lateral and vertical movement, to enable the plows to be readily guided. K are braces, the upper ends of which are attached to the forward parts of the draft-bars H. The rear ends of the braces K pass through slots in the lower parts of the forward standards F, and are secured in place by bolts, pins, or keys L. Several holes should be formed in the braces K, to receive the bolts, pins, or keys L, so that the braces K may be adjusted to correspond with the adjustment of the draft-bars H. M are the handles, the forward ends of which are bolted to the sides of the draft-bars H, and which are supported at the proper height by the braces N, the upper ends of which are bolted to the said handles M, and their lower ends are bolted to the said draft-bars H.

Having thus described my invention, I claim as new and desire to secure by Letters Patent—

The combination of the beams A, the slotted uprights F and G, the pivoted draft-bars H, and the braces K with each other, in substantially the manner herein shown and described.

GEORGE CROLL.

Witnesses:
C. C. WHITMORE,
T. J. KLUSSMAN.